United States Patent [19]

Harada et al.

[11] Patent Number: 5,106,693
[45] Date of Patent: Apr. 21, 1992

[54] TRANSPARENT GAS-BARRIER MULTILAYER STRUCTURE

[75] Inventors: Masahiro Harada; Toru Kino; Akira Iwamoto, all of Hiratsuka, Japan

[73] Assignee: Mitsubishi Gas Chemical Company, Inc., Tokyo, Japan

[21] Appl. No.: 549,647

[22] Filed: Jul. 6, 1990

Related U.S. Application Data

[63] Continuation of Ser. No. 277,244, Nov. 29, 1988, abandoned.

[30] Foreign Application Priority Data

Nov. 30, 1987 [JP] Japan ................. 62-300089

[51] Int. Cl.$^5$ .................. B32B 27/36; B32B 27/08
[52] U.S. Cl. .................. 428/412; 428/474.4; 428/474.7; 428/475.2; 428/476.3; 428/480; 428/522; 428/523
[58] Field of Search ............ 428/475.2, 474.4, 474.7, 428/476.3, 412, 480, 523, 522; 525/432

[56] References Cited

U.S. PATENT DOCUMENTS

| | | |
|---|---|---|
| 3,843,479 | 10/1974 | Matsunami et al. ......... 428/474.7 X |
| 4,486,507 | 12/1984 | Schumacher ............... 428/476.3 X |
| 4,607,073 | 8/1986 | Sakashita et al. ............ 525/432 X |
| 4,800,129 | 1/1989 | Deak ........................ 428/474.4 |

FOREIGN PATENT DOCUMENTS

| | | | |
|---|---|---|---|
| 0225049 | 6/1987 | European Pat. Off. ......... 428/474.4 |
| 0288972 | 11/1988 | European Pat. Off. ......... 428/474.4 |
| 23792 | 6/1981 | Japan . | |

*Primary Examiner*—Thomas J. Herbert, Jr.
*Attorney, Agent, or Firm*—Wenderoth, Lind & Ponack

[57] ABSTRACT

A transparent gas-barrier multilayer structure comprising (A) at least one layer of a polyamide composition comprising (a) 30 to 80 parts by weight of a first polyamide composed of an aromatic dicarboxylic acid as a main acid component and an aliphatic diamine as a main diamine component and (b) 70 to 20 parts by weight of a second polyamide composed of an aliphatic dicarboxylic acid as a main acid component and m-xylylenediamine as a main diamine component, the total amount of the first polyamide and the second polyamide being 100 parts by weight, and (B) at least one layer of a thermoplastic resin other than the polyamide composition, said at least one layer (A) being bonded to said at least one layer (B).

8 Claims, No Drawings

TRANSPARENT GAS-BARRIER MULTILAYER STRUCTURE

This application is a continuation of now abandoned application, Ser. No. 07/277,244 filed on Nov. 29, 1988 is now abandoned.

This invention relates to a transparent gas-barrier multilayer structure. More specifically, it relates to a transparent and heat-resistant gas-barrier multilayer structure, such as a container, a film or a sheet, which has excellent processability and does not undergo deformation or loss of transparency when retorted for sterilization or filled with foods or drinks at high temperatures.

In recent years, multilayer sheets, films and containers composed of various gas-barrier resins and thermoplastic resins such as a polyester, polyamide or polyolefin have gained widespread for packaging foods and drinks which require excellent gas-barrier properties.

Ethylene/vinyl alcohol copolymer resins, vinylidene chloride copolymer resins, acrylonitrile copolymer resins and poly-m-xylylene adipamide resins (nylon MXD6) are known to be used in the gas-barrier layer of such a packaging material.

Since nylon MXD6 has excellent gas-barrier property and better thermal stability during melting than the other gas-barrier resins, it can be co-extruded or co-injection-molded with a thermoplastic resin such as polyethylene terephthalate (PET), nylon 6 and polypropylene, and positive efforts have recently been made to utilize it as a gas-barrier layer of multilayer structures.

Polyamides obtained by polycondensation reaction between aliphatic dicarboxylic acids and m-xylylenediamine, typified by nylon MXD6, have a glass transition point of about 70° C. Accordingly, a transparent broad mouthed container or a transparent bottle composed of a nylon MXD6 layer and a PET layer formed by stretch blow molding has the property of shrinking greatly when immersed in hot water at 80° C. or higher.

It is therefore impossible, or very difficult, to use a container including nylon MXD6 for holding foods and drinks which require retorting or hot filling.

Japanese Patent Publication No. 23792/1981 proposes a multilayer container having gas-barrier property which contains a layer of nylon MXD6 and a layer of a polyolefin such as polyethylene or polypropylene.

However, since the polyolefin has a higher right processing temperature during various molding and processing operations such as deep drawing and stretch blow molding than PET, molding of a container from it is very difficult. The same can be said with respect to polycarbonates. Furthermore, since nylon MXD6 is liable to crystallize in direct blow molding, molding of it into a container is also very difficult.

Accordingly, in the above multilayer container produced by using nylon MXD6, thickness unevenness and whitening are observed in the nylon MXD6 layer, and it is impossible to obtain multilayer containers which are satisfactory in practical applications in regard to, for example, shape, gas-barrier property and transparency.

It is an object of this invention therefore to provide a transparent gas-barrier multilayer structure.

Another object of this invention is to a multilayer structure, such as a packaging material, which has transparency, gas-barrier property, excellent processability, lightweight and resistance to breakage and can withstand sterilizing retorting and hot filling operations, and is thus well balanced for practical applications.

Still another object of this invention is to provide a transparent gas-barrier multilayer structure, in which at least one layer is composed of a specific polyamide composition, and at least one other layer is composed of another thermoplastic resin.

A further object of this invention is to provide a transparent gas-barrier multilayer structure which is produced with excellent processability by coextruding or co-injection-molding the specific polyamide composition and the other thermoplastic resin to form a precursor such as a sheet, film or parison, and blow molding, deep drawing, or stretching the precursor.

Other objects of this invention along with its advantages will become apparent from the following description.

According to this invention, these objects and advantages are achieved by a transparent gas-barrier multilayer structure comprising (A) at least one layer of a polyamide composition comprising (a) 30 to 80 parts by weight of a first polyamide composed of an aromatic dicarboxylic acid as a main acid component and an aliphatic diamine as a main diamine component and (b) 70 to 20 parts by weight of a second polyamide composed of an aliphatic dicarboxylic acid as a main acid component and m-xylylenediamine as a main diamine component, the total amount of the first polyamide and the second polyamide being 100 parts by weight, and (B) at least one layer of a thermoplastic resin other than the polyamide composition, said at least one layer (A) being bonded to said at least one layer (B).

The first polyamide (a) of the polyamide composition (A) used in the multilayer structure is derived from an aromatic dicarboxylic acid as a main acid component and an aliphatic diamine as a main diamine component.

Isophthalic acid, terephthalic acid or a mixture of both is preferably used as the aromatic dicarboxylic acid. In the mixture of terephthalic acid and isophthalic acid, the proportion of isophthalic acid is desirably at least 50 mole %.

An aliphatic dicarboxylic acid, especially a linear aliphatic dicarboxylic acid having 4 to 12 carbon atoms, is preferably used as a subsidiary acid component.

Examples of the aliphatic dicarboxylic acid are succinic acid, adipic acid, pentadioic acid, suberic acid, pimelic acid, azelaic acid, sebacic acid and dodecanedioic acid.

Preferably, the acid component of the first polyamide (a) is composed of 100 to 70 mole % of the aromatic dicarboxylic acid and 0 to 30 mole % of the aliphatic dicarboxylic acid. If the proportion of the aliphatic dicarboxylic acid exceeds 30 mole %, the resulting polyamide undesirably has a much lowered glass transition temperature and greatly reduced gas-barrier property.

Preferably, the aliphatic diamine of the first polyamide is, for example, an aliphatic diamine having two aminomethyl groups in the molecule or an alicyclic diamine. Examples of such aliphatic diamines are hexamethylenediamine and tetramethylenediamine. Examples of the alicyclic diamine are 1,3-bisaminomethylcyclohexane and bis(4-aminocyclohexyl)methane.

The diamine component of the first polyamide is composed preferably of 100 to 95 mole % of the aliphatic diamine having two aminomethyl groups in the molecule and 0 to 5 mole % of the alicyclic diamine.

The first polyamide (a) generally has a higher glass transition point than the second polyamide (b) by, for example, at least about 20° C. Accordingly, the use of the first polyamide (a) contributes much to an improvement in the thermal resistance of the multilayer structure of the invention.

Furthermore, the first polyamide (a) is generally difficultly-crystallizable or substantially amorphous. This fact is believed to bring about a marked improvement in moldability or processability during direct blow molding, inflation, stretching, stretch blow molding, or deep drawing in the manufacture of the multilayer structure of the invention.

The second polyamide (b) of the polyamide composition (A) used in the multilayer structure of the invention is derived from an aliphatic dicarboxylic acid as a main acid component and m-xylylenediamine as a main diamine component.

Linear aliphatic dicarboxylic acids having 4 to 12 carbon atoms are preferably used as the aliphatic dicarboxylic acid. Specific examples of these aliphatic dicarboxylic acid are suberic acid, pimelic acid, azelaic acid, sebacic acid and adipic acid. Adipic acid is especially preferred.

Aromatic dicarboxylic acids exemplified above with regard to the first polyamide (a) may be used as other dicarboxylic acids.

The dicarboxylic acid component of the second polyamide preferably comprises at least 90 mole % of the aliphatic dicarboxylic acid.

The diamine component of the second polyamide (b) is composed mainly of m-xylylenediamine.

The subsidiary diamine component may be, for example, an aliphatic diamine having 4 to 12 carbon atoms, a diamine having an alicyclic group, or an aromatic diamine.

Examples of the aliphatic diamine are tetramethylenediamine, pentamethylenediamine, hexamethylenediamine and octamethylenediamine.

Examples of the diamine having an alicyclic group are 1,3-bis(aminomethyl)cyclohexane and 1,4-bis-(aminomethyl)cyclohexane.

Examples of the aromatic diamine are p-xylylenediamine and m-phenylenediamine.

The subsidiary diamine component may account for 0 to 5 mole % of the total diamine component.

The polyamide composition (A) constituting the multilayer structure of the invention comprises 30 to 80 parts by weight of the first polyamide (a) and 70 to 20 parts by weight of the second polyamide (b), the total amount of the first polyamide (a) and the second polyamide (b) being 100 parts by weight. Preferably, it comprises 35 to 60 parts by weight of the first polyamide (a) and 65 to 40 parts by weight of the second polyamide (b). Especially preferably, it comprises 35 to 40 parts by weight of the first polyamide (a) and 65 to 60 parts by weight of the second polyamide (b).

If the proportion of the first polyamide (a) in the polyamide composition (A) is lower than 30 parts by weight, the first polyamide (a) tends to produce a reduced effect of improving thermal resistance, moldability or processability. On the other hand, if it exceeds 80 parts by weight, the polyamide composition has reduced gas-barrier property because it results in a smaller proportion of the second polyamide (b) which has excellent gas-barrier property.

In the preparation of the polyamide composition (A) from the first polyamide (a) and the second polyamide (b), the first and second and polyamide may be melt-mixed to form granules, and the granules, coextruded or co-injection-molded. Alternatively, the first and second polyamide in pellet form are well mixed in the solid state, and the mixed pellets are co-extruded or co-injection-molded so that during this operation they are further mixed.

The other thermoplastic resin (B) which differs from the polyamide composition (A) may preferably be, for example, a polyolefin, polystyrene, a polyester, a polycarbonate and a polyamide.

Specific examples of the polyolefin are polyethylene, polypropylene, copolymers of two or more alphaolefins such as ethylene, propylene and butene, and mixtures of these polymers.

The polyesters may be those composed of a dicarboxylic acid component and a diol component. The diol component is preferably composed mainly or wholly of ethylene glycol and/or cyclohexanedimethanol. Examples of diols as a minor diol component include neopentyl glycol, propylene glycol, butanediol, diethylene glycol and bis(hydroxyethoxy)benzene.

The dicarboxylic acid component of the polyesters is preferably composed mainly or wholly of at least one dicarboxylic acid selected from, for example, terephthalic acid, isophthalic acid and naphthalenedicarboxylic acid.

Adipic acid, sebacic acid and hexahydroterephthalic acid, for example, may be cited as a minor dicarboxylic acid component.

Examples of the polyester are polyethylene terephthalate (PET), polycyclohexanedimethylene terephthalate, polycyclohexanedimethylene isophthalate and polyethylene naphthalene dicarboxylate, and copolyesters composed mainly of recurring units of these polyesters.

These polyesters may contain a hydroxycarboxylic acid component such as p-hydroxybenzoic acid as part of the dicarboxylic acid component.

These polyesters may be used singly or in combination.

The polycarbonate may preferably be, for example, a polycarbonate composed of a carbonate of bisphenol A as main recurring units.

Examples of the polyamide are aliphatic polyamides such as nylon 6, nylon 66, nylon 11, nylon 12, nylon 46 and nylon 610 and copolyamides composed of the recurring units of these polyamides as main units.

The above thermoplastic resins may be used as a mixture unless the layer of the thermoplastic resin (B) completely loses transparency.

The multilayer structure of the invention comprises at least one layer of the polyamide composition (A) and at least one layer of the other thermoplastic resin (B). The layer of the polyamide composition and the layer of the thermoplastic resin, or layers of the polyamide composition, or layers of the other thermoplastic resin may respectively be bonded to each other either directly or through an adhesive.

The adhesive used preferably comprises a modified polyolfein such as polyethylene, polypropylene, or a copolymer of olefins such as ethylene, propylene and butene as an adhesive resin for bonding between the polyamide composition layer and a later of a polyolefin.

For bonding between layers of the polyamide composition or between the layers of polyester or polycarbonate, a preferred adhesive resin may be an ethylene/vinyl acetate copolymer, an ethylene/acrylic acid copolymer, an alkali or alkaline earth metal crosslinked product of an ethylene/acrylic acid copolymer, or an ethylene/acrylate copolymer.

The multilayer structure of this invention can be produced by co-extrusion based on an inflation method or a T-die method, co-injection molding caked sandwich molding and two-color molding in which two or more molten resins are successivley injected into a mold, stretch blow molding, direct blow molding, deep draw molding, etc.

A sheet, film, tube or container produced by co-extrusion or co-injection molding may be used directly, or after it is further molded into a container or a bag by some heating, heat sealing or by other bonding methods. Alternatively, they may be subjected to stretching, stretch blow molding, or vacuum/pressure forming, and used as films or containers. It is of course possible to form the sheet and film into bags by stretching and heat sealing or by other bonding methods.

As stated above, the multilayer structure of this invention include, for example, sheets, films, bags, tubes, and containers such as bottles, caps and cans.

In the multilayer structure of this invention, both of the layers of the polyamide composition and the other thermoplastic resin may be unstretched, or at least one of them may be stretched.

If the multilayer structure of the invention is a container for holding water-containing foods or drinks which require hot filling, it is preferred to form the innermost layer of the container from a thermoplastic resin other than polyamides to avoid water absorption by the polyamide layer and the consequent deterioration in gas-barrier property and mechanical properties.

The following Examples and Comparative Examples illustrate the present invention specifically.

The various properties were measured by the following methods.

(1) Haze

Measured by JIS K-6714 or ASTM D883-62T using a digital hazemeter (ND-504AA made by Nippon Denshoku Kogyo K. K.).

(2) Shrinkage

Indicator lines were drawn longitudinally and laterally in a film or container sample, and the lengths of the indicator lines before and after the treatment were measured. The shrinkage (%) was calculated in accordance with the following equation.

$$\text{Shrinkage (\%)} = \left(1 - \frac{a \times b}{a_o \times b_o}\right) \times 100$$

wherein
$a_o$ and $b_o$: the lengths of the indicator lines in the longitudinal and lateral directions before the treatment.
a and b: the lengths of the indicator lines in the longitudinal and lateral directions after the treatment (3) Oxygen permeability Measured substantially in accordance with ASTM D3985 using OXTRAN 100A made by Modern Control Co., Ltd. The measuring conditions were as follows:

Temperature: 20° C. both inside and outside of a sample container.

Outside of the container: air at a relative humidity of 65%.

Inside of the container: nitrogen gas at a relative humidity of 100%.

The shelf life (calculated) denotes the period of storage which elapsed until the concentration of oxygen inside the container reached 5 mg/liter (initial value 0 mg/liter). It was calculated from the measured oxygen permeability of the container.

(4) Glass transition temperature (Tg)

Measured by the DSC method using SSC/5605 made by Seiko Electronics Co., Ltd. at a temperature elevating rate of 20° C./min.

EXAMPLE 1

A copolyamide (Tg=120° C.) was produced from isophthalic acid, terephthalic acid and hexamethylenediamine (mole ratio 70/30/100) as starting materials.

Pellets of this copolyamide and pellets of nylon MXD6 (Tg=75° C.) were mixed in a weight ratio of 35:65 in the solid state. Using the mixed pellets, polypropylene (FY-6C, a product of Mitsubishi Petrochemical Industries, Ltd.) and modified polypropylene (QF-305, a product of Mitsui Petrochemical Industries, Ltd.) as an adhesive layer, a 3-kind 5-layer sheet (thickness: 0.8 mm) consisting of two outside layers of polypropylene, an interlayer of polyamide C, and modified polypropylene layers each between the interlayer and each outside layer was prepared by a T-die method with an extruder (45×65×45 mm) and feed blocks.

The sheet was molded into a container having a depth of 26 mm, an opening portion diameter of 64 mm and a bottom portion diameter of 53 mm by means of a vacuum former.

The moldability was very good. The resulting container had good transparency, and the thickness of the interlayer was uniform.

Water was put in the container, and an aluminum foil having a heat-sealable layer was put over the container. The container was sealed up by means of a heatsealing machine.

The container holding water was retorted at 120° C. for 30 minutes under pressure using a retorting autoclave.

It was determined that after the retorting, the container retained its good transparency and original shape.

The results of its evaluation are shown in Table 1.

COMPARATIVE EXAMPLE 1

A 3-kind 5-layer sheet (thickness 0.8 mm) was prepared in the same way as in Example 1 except that the interlayer was changed to a layer of nylon MXD6 (Tg=75° C.)

A container was formed by vacuum forming of the sheet as in Example 1.

Owing to the crystallization of nylon MKXD6, stretching unevenness and partial whitening were seen in the container. The thickness of the interlayer was nonuniform.

After heat sealing as in Example 1, the container was retorted at 120° C. for 30 minutes. After retorting, the entire container was whitely hazy.

The results of its evaluation are shown in Table 1.

COMPARATIVE EXAMPLE 2

A 3-kind 5-layer sheet (thickness 0.8 mm) was prepared in the same way as in Example 1 except that the interlayer was changed to a layer of a mixture of the same polyamide as used in Example 1 (isophthalic acid/terephthalic acid/hexamethylenediamine=70/30/100 mole ratio as starting materials) and nylon MXD6 in a weight ratio of 90:10.

A container was molded by vacuum forming of the sheet as in Example 1.

The container had very good moldability as in Example 1, and very good transparency with a uniform interlayer thickness.

After heat-sealing as in Example 1, the container was retorted at 120° C. for 30 minutes. After retorting, the container was whitely hazy, and heavily deformed.

The results of evaluation of the container are shown in Table 1.

TABLE 1

| Run | Example 1 | Comparative Example 1 | Comparative Example 2 |
|---|---|---|---|
| Proportion of the thickness of the barrier layer of the sheet (%) | 6 | 6 | 6 |
| Secondary moldability | Good | Poor (stretching unevenness, whitening) | Good |
| Before retorting | | | |
| Haze of the bottom of the container (%) | 18 | 37 (other than the whitened portion) | 17 |
| Oxygen permeability (cc/day-atm) | 0.016 | 0.024 | 0.019 |
| After retorting (*) | | | |
| Haze of the bottom of the container (%) | 19 | 43 | 35 |
| Change in the shape of the container | None | None | Large deformation (the interlayer got out of place) |

(*): Retorting was carried out at 120° C. for 30 minutes.

EXAMPLE 2

A copolyamide (Tg=118° C.) was obtained from isophthalic acid, terephthalic acid and hexamethylenediamine (mole ratio 80/20/100).

Pellets of the copolyamide and pellets of nylon MXD6 (Tg=75° C.) were mixed in a weight ratio of 40:60 in the solid state. The resulting mixed pellets and PET (RT-543, a product of Nippon Unipet Co., Ltd.) were successively injected into a mold from different injection-molding machines to form a 5-layer parison composed of an inside and an outside layer of PET, an interlayer of PET, and layers of the composition of the copolyamide and nylon MXD6 each between the inside or outside layer and the intermediate layer.

The parison was blow-molded at a temperature of about 100° C. under a blowing pressure of 20 kg/cm² to give a 5-layer bottle having an inner capacity of 1.5 liters. The thicknesses of the individual layers of the 5-layer bottle, and the results of its evaluation are shown in Table 2.

COMPARATIVE EXAMPLE 3

A 5-layer parison composed of an inside layer, an outside layer and an interlayer of PET, and layers of nylon MXD6 each between the inside or outside layer and the interlayer was formed in the same way as in Example 2 except that nylon MXD6 was used instead of the mixed pellets of the copolyamide and nylon MXD6.

The parison was blow-molded at 85° to 95° C. under 20 kg/cm² to give a 5-layer bottle having an inner capacity of 1.5 liters.

The thicknesses of the individual layers of the 5-layer bottle, and the results of its evaluation are shown in Table 2.

In this Comparative Example, attempts were made to blow-mold the parison at the same blowing temperature as in Example 2. But the parison was deformed by its own weight, or whitening and crystallization occurred in the nylon MSD6 layers. Thus, molding was difficult. When molding could be effected, the resulting bottle had a non-uniform thickness or was whitened.

COMPARATIVE EXAMPLE 4

A 5-layer parison composed of an inside layer, an outside layer and an interlayer of PET and layers of copolyamide each between the inside or outside layer and the interlayer was formed in the same way as in Example 2 except that copolyamide (isophthalic acid/terephthalic acid/hexamethylenediamine=80/20/100 moles as starting materials) was used instead of the mixed pellets of the copolyamide and nylon MXD6.

The resulting parison was blow-molded at 120° to 130° C. under 20 kg/cm². Deformation occurred because of the own weight of the parison, or whitening and crystallization occurred in he PET layer. Even when the blow molding could be effected, the resulting bottle had a nonuniform thickness and was whitened to such an extent that it was devoid of commercial value.

An attempt was made to perform blow molding at the same blowing temperature as used in Example 2. But the copolyamide did not sufficiently stretch, and the blow molding was difficult.

TABLE 2

| Run | Example 2 | Comparative Example 3 | Comparative Example 4 |
|---|---|---|---|
| Thickness of the body portion (micrometers) | | | |
| 1st layer | 92 | 90 | — |
| 2nd layer | 15 | 15 | — |
| 3rd layer | 98 | 97 | — |
| 4th layer | 10 | 11 | — |
| 5th layer | 145 | 147 | — |
| Haze of the body portion (%) | 1.6 | 1.7 | whitened |
| Oxygen permeability (cc/day-atm) | 0.12 | 0.12 | — |
| Shrinkage after hot water (85° C.) filling (%) | 3 | 12 | — |

EXAMPLE 3

A copolyamide (Tg=125° C.) was obtained from isophthalic acid, terephthalic acid and hexamethylenediamine (mole ration 65/35/100) as starting materials.

Pellets of the copolyamide and pellets of nylon MXD6 (Tg=75° C.) were mixed in a weight ratio of 40:60 in the solid state. The resulting mixed pellets and polycarbonate (S 2000 produced by Mitsubishi Gas-Chemical Co., Ltd.) were successively injected into a mold from different injection-molding machines to produce a 3-layer parison composed of an inside and an outside layer of polycarbonate and an interlayer of the composition composed of the copolyamide and nylon MXD6.

The parison was blow-molded at about 150° C. under 20 kg/cm² to obtain a 3-layer bottle having an inner capacity of 1.0 liter.

The bottle had a glass-like appearance and could endure hot filling at 90° C.

The thicknesses of the individual layers of the bottle and the results of its evaluation are shown in Table 3.

COMPARATIVE EXAMPLE 5

A 3-layer parison composed of an inside and an outside layer of polycarbonate and an interlayer of nylon MXD6 was formed in the same way as in Example 3 except that nylon MXD6 alone was used instead of the mixed pellets of the copolyamide and nylon MXD6.

An attempt was made to blow-mold the parison at the blowing temperature shown in Example 3. But whitening and crystallization occurred in the nylon MXD6 layer, and the blow-molding could not be performed.

COMPARATIVE EXAMPLE 6

A 3-layer parison composed of an inside and an outside layer of polycarbonate and an interlayer of the copolyamide was formed in the same way as in Example 3 except that the same copolyamide as used in Example 3 was used instead of the mixed pellets of the copolyamide and nylon MXD6.

The parison was blow-molded under the same conditions as in Example 3 to obtain a 3-layer bottle having an inner capacity of 1.0 liter.

The thicknesses of the individual layers of the 3-layer bottle, and the results of its evaluation are shown in Table 3.

TABLE 3

| Run | Example 3 | Comparative Example 6 |
|---|---|---|
| Thickness of the body portion (micrometers) | | |
| 1st layer | 130 | 130 |
| 2nd layer | 30 | 30 |
| 3rd layer | 180 | 180 |
| Oxygen permeability (cc/day-atm) | 0.15 | 0.35 |
| Shelf life (weeks) | 16 | 7 |

EXAMPLE 4

A copolyamide (Tg=112° C.) was produced from isophthalic acid, terephthalic acid, hexamethylenediamine and bis(p-aminocyclohexyl)methane (mole ratio 71/29/98/2) as starting materials.

Pellets of the copolyamide and pellets of nylon MXD6 were mixed in a weight ratio of 35:65 in the solid state. A 3-kind 5-layer sheet composed of two outside layers of polycarbonate, an interlayer of the mixed polyamide and layers of modified polyolefin between each outside layer and the interlayer was prepared from the mixed pellets, polycarbonate (E-1000, a product of Mitsubishi Gas-Chemical Co., Ltd.), and modified polyolefin (Admer AT469C, a product of Mitsui Petrochemical Industries, Ltd.) as an adhesive layer by using the same apparatus as in Example 1.

The sheet was molded into a container having a depth of 26 mm, an opening portion diameter of 64 mm and a bottom portion diameter of 53 mm by means of a vacuum former at 160° C. The moldability was good, and the resulting container had excellent transparency.

COMPARATIVE EXAMPLE 7

A 3-kind 5-layer sheet composed of two outside layers of polycarbonate, an interlayer of nylon MXD6 and adhesive layers of modified polyolefin between each outside layer and the intermediate layer was prepared in the same way as in Example 4 except that nylon MXD6 pellets were used instead of the mixed pellets of the copolyamide and nylon MXD6.

The sheet was vacuum-formed under the same conditions as in Example 4. The nylon MXD6 layer crystallized and whitened, and stretching unevenness was observed. A container of a satisfactory shape could not be obtained.

As can be seen from the foregoing description, the gas-barrier multilayer structure of the invention has excellent processability and can be used, for example, as a container or a bag which does not undergo deformation and retains good transparency and gas-barrier property even when treated with hot water or retorted for sterilization or disinfection.

We claim:

1. A transparent gas-barrier multilayer structure comprising
   (A) at least one layer of a polyamide composition comprising
      (a) 35 to 60 parts by weight of a first polyamide composed of a homopolyamide or copolyamide of an aromatic dicarboxylic acid as a main acid component and a hexamethylene diamine as a main diamine component, said aromatic dicarboxylic acid being isophthalic acid, terephthalic acid, or both, and
      (b) 65 to 40 parts by weight of a second polyamide composed of a homopolyamide or copolyamide of an adipic dicarboxylic acid as a main acid component and m-xylylenediamine as a main diamine component,
   the total amount of the first polyamide and the second polyamide being 100 parts by weight, and
   (B) at least one layer of a thermoplastic resin other than the polyamide composition, said at least one layer (A) being bonded to said at least one layer (B).

2. The multilayer structure of claim 1 in which the other thermoplastic resin (B) is selected from polyolefins, polystyrene, polyesters, polycarbonates and polyamides.

3. The multilayer structure of claim 1 which consists essentially of layers (A) and (B).

4. The multilayer structure of claim 1 in which the acid component of the first polyamide (a) is composed of 100 to 70 mole % of the aromatic dicarboxylic acid and 0 to 30 mole % of an aliphatic dicarboxylic acid.

5. The multilayer structure of claim 1 in which the acid component of the second polyamide (b) is composed of at least 90 mole % of a adipic acid having 4 to 12 carbon atoms and up to 10 mole % of an aromatic dicarboxylic acid.

6. The multilayer structure of claim 1 in which the diamine component of the second polyamide (b) is composed of m-xylylenediamine and 0 to 5 mole % of a subsidiary diamine component selected from aliphatic diamines having 4 to 12 carbon atoms, diamines having an alicyclic group, and aromatic diamines.

7. The multilayer structure of claim 1 in which the diamine component of the first polyamide (a) is composed of 100 to 95 mole % of a hexamethylene diamine and 0 to 5 mole % of an alicyclic diamine.

8. The multilayer structure of claim 7 in which the alicyclic diamine is 1,3-bisaminomethylcyclohexane or bis(4-aminocyclohexylmethane).

* * * * *